United States Patent [19]

Bennett

[11] 4,296,831
[45] Oct. 27, 1981

[54] ACOUSTIC LINER FOR ATTENUATING NOISE

[75] Inventor: Stuart C. Bennett, Derby, England

[73] Assignee: Coal Industry (Patents) Limited, London, England

[21] Appl. No.: 141,250

[22] Filed: Apr. 17, 1980

[30] Foreign Application Priority Data

May 23, 1979 [GB] United Kingdom ............... 17965/79

[51] Int. Cl.³ .......................................... E04F 17/04
[52] U.S. Cl. ..................................... 181/224; 181/292
[58] Field of Search ............... 181/214, 213, 217–218, 181/224, 286, 288, 292; 52/145

[56] References Cited

U.S. PATENT DOCUMENTS

| | | | |
|---|---|---|---|
| 1,953,410 | 4/1934 | Jacopson | 181/292 |
| 2,652,126 | 9/1953 | Mazer | 52/145 X |
| 2,779,429 | 1/1957 | Mazer | 52/145 |
| 2,853,147 | 9/1958 | D'Eustachio | 181/224 |
| 2,994,401 | 8/1961 | Bourne et al. | |
| 3,113,634 | 12/1963 | Watters | 181/224 |
| 3,630,312 | 12/1971 | Woodward et al. | |
| 4,109,750 | 8/1978 | Wirt | 181/224 |

FOREIGN PATENT DOCUMENTS

| | | |
|---|---|---|
| 1202535 | 1/1960 | France . |
| 1480254 | 5/1967 | France . |
| 905601 | 9/1962 | United Kingdom . |

Primary Examiner—L. T. Hix
Assistant Examiner—Thomas H. Tarcza
Attorney, Agent, or Firm—James C. Wray

[57] ABSTRACT

An acoustic liner for attenuating noise comprises a backing face and a perforated facing sheet arranged over and spaced from the backing face, the perforated facing sheet being on non-uniform thickness in the direction of noise propagation.

10 Claims, 13 Drawing Figures

ACOUSTIC LINER FOR ATTENUATING NOISE

This invention relates to acoustic liners for attenuating noise.

In particular although not exclusively, the present invention relates to acoustic liners for silencers associated with vehicles.

It is known for such acoustic liners to comprise a perforated facing sheet or layer arranged over and spaced from a backing face. The attenuating characteristics of knwon acoustic liners can be altered by varying the uniform porosity of the perforated facing sheet, i.e. the difference in the total area of the perforated facing sheet and the actual solid area of the perforated facing sheet compared to the total area of the perforated facing sheet, and by varying the backing depth i.e. the distances between the perforated facing sheet and the backing face. However, with the variations to these parameters a maximum level of attenuation occurs beyond which the overall efficiency of the liner cannot be improved.

Different embodiments of acoustic liners have been used and some of these embodiments are described later in this specification. However these known embodiments either attenuated a limited frequency range or else tended to be unsuitable for use in the dirty conditions associated with vehicle silencers.

An object of the present invention is to provide an acoustic liner which attenuates noise over a wide frequency range and which is suited to use in dirty conditions associated with vehicle silencers.

According to the present invention an acoustic liner for attenuating noise comprises a perforated facing sheet having a non-uniform thickness.

Preferably, the thickness of the perforated facing sheet is non-uniform in the direction of noise propagation.

Conveniently, the thickness of the perforated facing sheet is carried by means of steps.

Alternatively, the perforated spacing sheet is tapered in the direction of noise propagation.

Alternatively, at least one face of the perforated facing sheet may be of wave form.

Preferably, the acoustic liner comprises a backing face, the perforated facing sheet being arranged over and spaced from the backing face.

Advantageously, a number of wave guides are provided between the backing face and the perforated facing sheet, the wave guides effectively dividing the acoustic liner into a plurality of cells.

Conveniently, the perforated facing sheet is constituted by a single layer, the layer having a non-uniform thickness.

Alternatively, the perforated facing sheet is constituted by a plurality of layers, at least some of the layers being non-continuous.

Preferably, the porosity of the perforated sheet is non-uniform.

Advantageously, the porosity of any particular portion of the perforated facing sheet is associated with the thickness of the portion.

By way of example only, three embodiments of the present invention will be described with reference to the accompanying drawings, in which.

Figure 1:
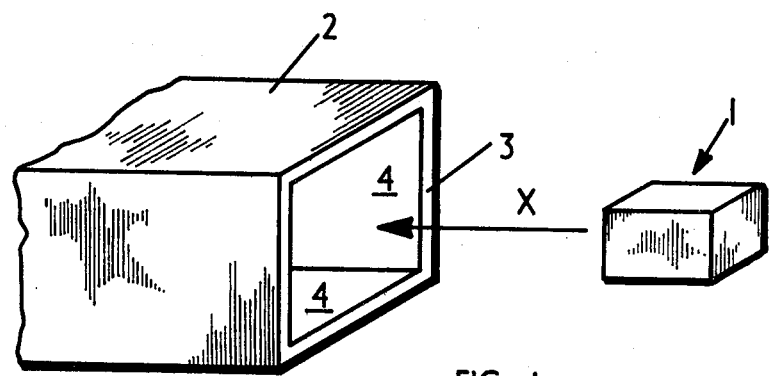
FIG. 1 is a diagram illustrating a noise source and a silencer associated with the noise source and provided with an acoustic liner for attenuating noise.

FIG. 1 illustrates a noise source 1, for example a vehicle drive motor or cooling fan, and an associated elongate silencer 2 (only one end of which is shown) provided with an acoustic liner 3 for attenuating noise, the acoustic liner 3 is provided on all four walls of the generally rectangular shaped silencer and comprises an inner perforated facing sheet 4 constituting a laminar absorber. Typically in cross-section the silencer walls are of the order of thirty to sixty centimeters and the acoustic liner backing depth, i.e. the distance between the perforated facing sheet and a backing face adjacent to the silencer wall, is of the order of two and one half centimeters.

Figure 2:
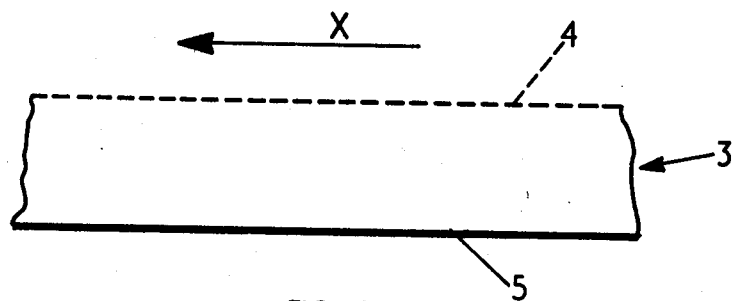
FIG. 2 is a diagram illustrating the section through one prior known embodiment of acoustic liner.

FIG. 2 illustrates the section through one embodiment of acoustic liner 3 comprising a perforated facing sheet 4 arranged over and spaced from a backing face 5. Typically, the measurement across the holes constituting the perforations in the facing sheet is of the order of one to four millimeters. Typically, the porosity of the perforated facing sheet, i.e. the difference in the total area of the perforated facing sheet and the actual solid area of the perforated facing sheet compared to the total area of the perfprated sheet is of the order of fifteen to twenty percent but can be as low as five percent.

Figure 10:
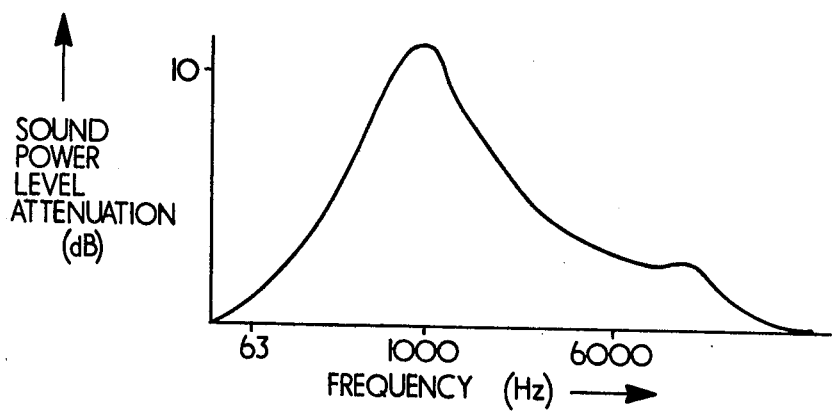
FIG. 10 is a typical graph illustrating the narrow bandwidth attenuation spectrum for an acoustic liner as illustrated in FIG. 2.

FIG. 10 shows a typical narrow bandwidth attenuation spectrum i.e. a graph illustrating attenuation against frequency, obtained with an acoustic liner as illustrated in FIG. 2. The graph shows a peak attenuation frequency at approximately one thousand hertz. The graph falling to near zero attenuation at frequencies of approximately sixty three hertz and six thousand hertz. Although a secondary, minor anti peak is shown to occur at frequencies higher than six thousand hertz, this prior known embodiment of acoustic liner tends not to efficiently attenuate noise occurring at frequencies higher than six thousand hertz.

Figure 3:
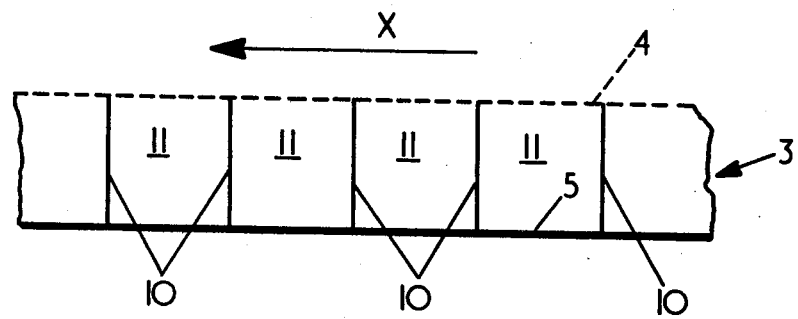
FIG. 3 is a diagram similar to FIG. 2 but illustrating the section through a second prior known embodiment of acoustic liner.

FIG. 3 illustrates the section through a second embodiment of prior known acoustic liner in which wave guides 10 extend between perforated facing sheet 4 and the backing face 5, the wave guides adding mechanical stability to the liner and dividing the acoustic liner into a honeycomb of separate generally hexagonal or cubical cells 11, each typically having a maximum internal dimension of the order of two centimeters.

Principally, an acoustic liner as shown in FIG. 3 has a typical narrow bandwidth attenuation spectrum similar to that obtained with the first described liner. However, 'flanking transmission' i.e. wave transmission generated between the perforated facing sheet and the backing face and travelling along the backing face substantially are eliminated. However, the second embodiment of acoustic liner still tends not to be efficient in attenuating noise occurring at frequencies higher than six thousand hertz.

Figure 4:
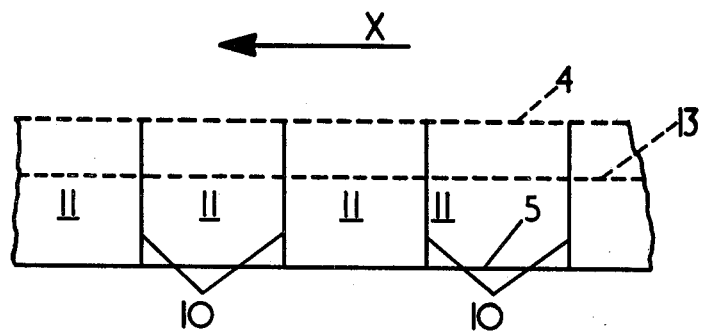
FIG. 4 is a diagram similar to FIG. 2 but illustrating the section through a third prior known embodiment of acoustic liner.

FIG. 4 illustrates the section through a third prior known embodiment of acoustic liner comprising a second perforated sheet or layer 13 inserted between the perforated facing sheet 4 and the backing face 5.

Figure 11:
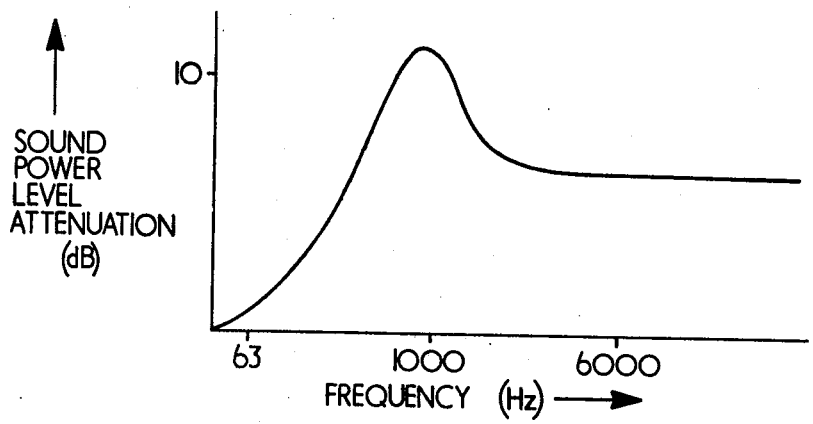
FIG. 11 is a typical graph illustrating the narrow bandwidth attenuation spectrum for an acoustic liner as illustrated in FIG. 4.

The effect of the second perforated sheet 13 on the typical narrow bandwidth attenuation spectrum obtained can be seen in FIG. 11, the anti-resonance region at around six thousand hertz tends to be filled in. Thus, this embodiment of acoustic liner tends to be slightly more efficient in attenuating noise at frequencies above one thousand hertz.

Figure 5:
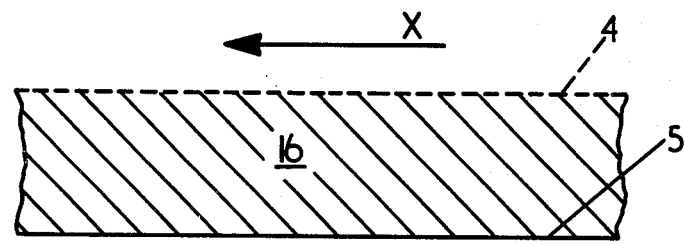
FIG. 5 is a diagram similar to FIG. 2 but illustrating the section through a forth prior known embodiment of acoustic liner.
Figure 12:
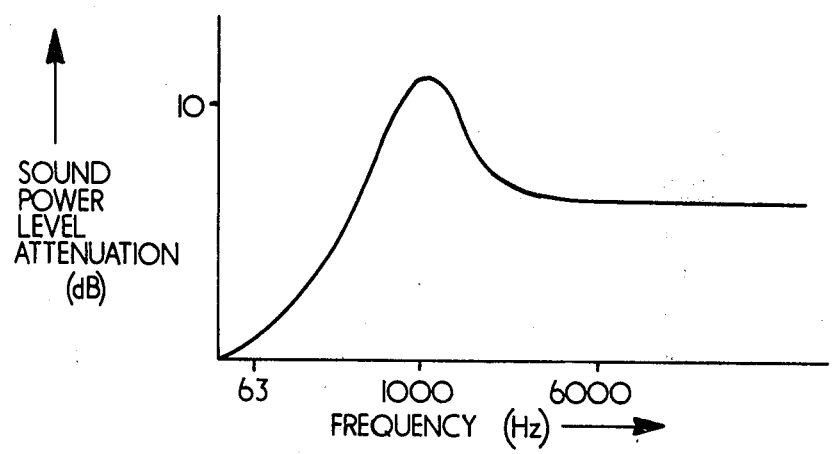
FIG. 12 is a typical graph illustrating the narrow bandwidth attenuation spectrum for an acoustic liner as illustrated in FIG. 5.

FIG. 5 illustrates the section through a fourth prior known embodiment of acoustic liner in which the space formed by the backing depth between the perforated facing sheet 4 and the backing face 5 is filled with packing 16, for example, foam or a fibrous mineral wool material. The effect of the packing can be seen in FIG. 12 which illustrates a typical narrow bandwidth attenuation spectrum obtained with an acoustic liner as illustrated in FIG 5. For frequencies below one thousand hertz the graph is similar to that obtained with the previously described acoustic liners. However, for frequencies over one thousand hertz the attenuation falls to approximately one half of the peak attenuation and then substantially maintains this level throughout the relevant higher frequencies.

Thus, it is clear that for the range of higher frequencies the acoustic liner illustrated in FIG. 5 is more efficient in attenuating noise than the previously described acoustic liners. Unfortunately, the acoustic liner illustrated in FIG. 5 tends not to be suitable for use in dirty conditions frequently encountered in silencer installations, the dirt particles or fluid penetrating the packing and reducing the attenuating efficiency. Consequently, the prior known embodiment of acoustic liner as illustrated in FIG. 5 tends to have relatively short efficient operational life.

Figure 6:
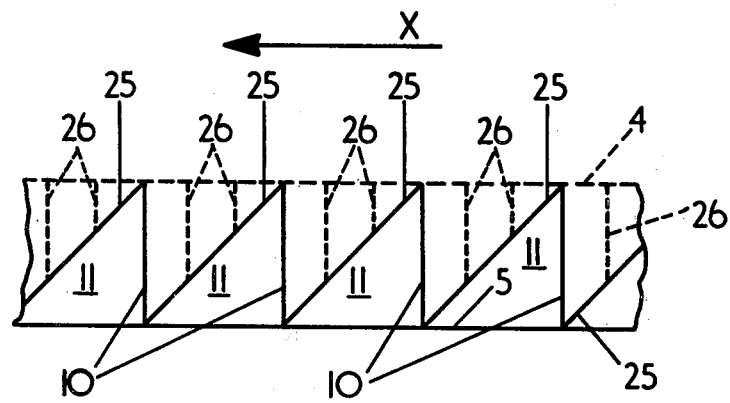
FIG. 6 is a diagram similar to FIG. 2 but illustrating the section through a fifth prior known embodiment of acoustic liner.

FIG. 6 illustrates the section through a fifth embodiment of prior known acoustic liner comprising wave guides 10 dividing the acoustic liner into generally hexagonal or cubical cells 11, each of which is sub-divided by inclined wave guides 25 and a plurality of perforated wave guides 26 extending between the perforated facing sheet 4 and the inclined wave guides 25. This embodiment of acoustic liner tended to be less efficient than the liner illustrated in FIG. 5.

In order to provide an acoustic liner capable of working for relatively long periods in dirty conditions and capable of efficiently attenuating high frequency noise, the present invention provides an acoustic liner comprising a perforated facing sheet of non-uniform thickness.

Figure 7:
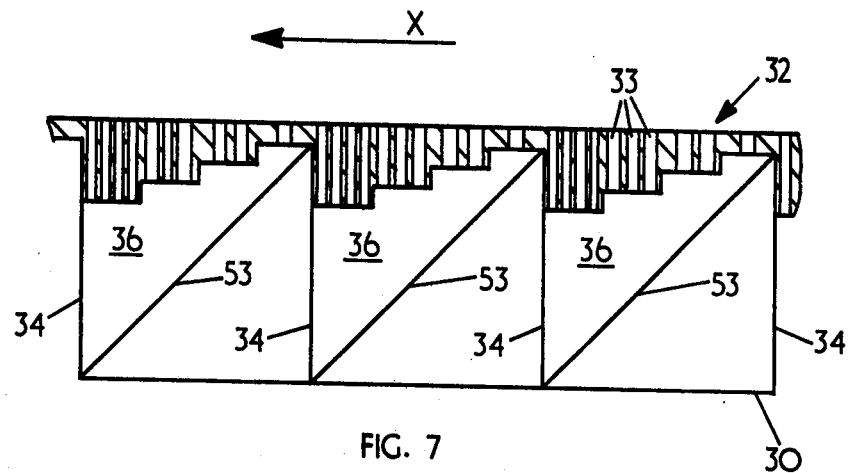
FIG. 7 is a diagram similar to FIG. 2 but illustrating the section through a first embodiment of acoustic liner constructed in accordance with the present invention.
Figure 8:
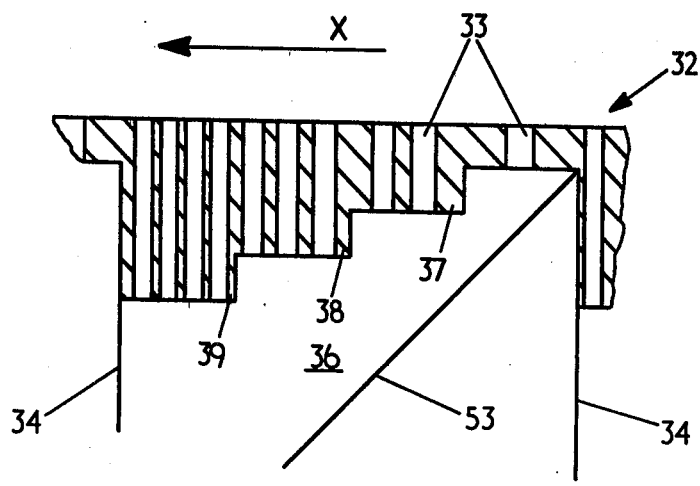
FIG. 8 is a diagram illustrating a detail of FIG. 7 drawn on an enlarged scale.

One embodiment of an acoustic liner constructed in accordance with the present invention is illustrated in FIGS. 7 and 8. FIG. 7 shows a section through the acoustic liner, the section being taken longitudinally along the silencer duct in the direction of noise travel. The acoustic liner comprises a solid backing face 30, a perforated facing sheet or layer 32 having holes or perforations 33 and arranged over and spaced from the solid backing face and a plurality of wave guides 34 dividing the acoustic liner into a plurality of generally hexagonal or cubical cells 36.

As seen in FIG. 7 and shown on an enlarged scale in FIG. 8 the portion of the perforated facing sheet 32 associated with each cell 36 is of non-uniform thickness, the thickness varying in the direction of noise propagation. The thickness of each portion increases in three step formations 37, 38 and 39 so that each of the four portions has a different thickness. In the embodiment shown, the thickness is increased in the direction of noise propagation. However, in other embodiments the thickness is reduced in the direction of noise propagation.

At each step the thickness increases, for example, by one millimeter the minimum thickness being, for example, one millimeter.

In some embodiments additional wave guides (not shown) extend from the edge of each step towards the backing face. In other embodiments inclined wave guides 53 are provided in each cell, the inclined wave guides being additional to or instead of wave guides arranged substantially normal to the backing face.

Figure 13:
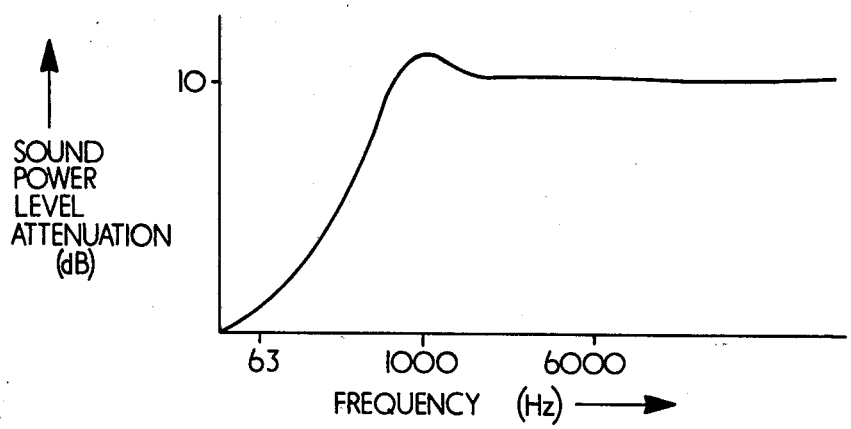
FIG. 13 is a typical graph illustrating the narrow bandwidth attenuation spectrum for an acoustic liner as illustrated in FIG. 7.

FIG. 13 illustrates a typical narrow bandwidth attenuating spectrum for an acoustic liner illustrated in FIGS. 7 and 8. The graph obtained for frequencies below one thousand hertz is similar to that obtained with the previously described acoustic liners. However, for relatively high frequency noise at frequencies higher than one thousand hertz a more efficient attenuation is achieved. The higher efficiency tending to be maintained throughout the range of relevant frequencies.

Figure 9:
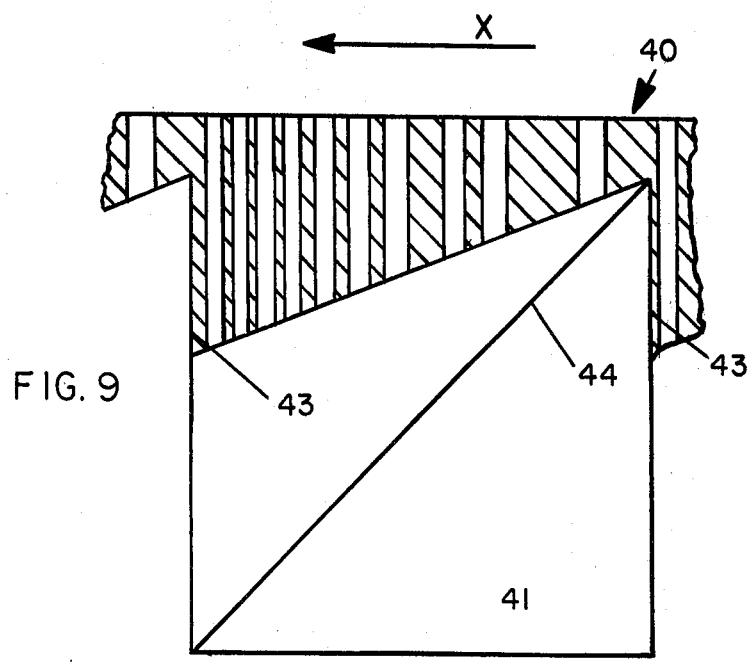
FIG. 9 is a diagram illustrating a second embodiment of the detail of FIG. 8.

FIG. 9 illustrates a portion of perforated facing sheet 40 for a third embodiment of acoustic liner in which the normally hidden surface of the perforated facing sheet, i.e. the surfae directed towards the backing face 41 is tapered in the direction of noise travel. Each portion associated with a generally hexagonal or cubical cell defined by wave guides 43 comprises the tapered formation so that a generally saw toothed shaped perforated facing sheet is formed. In the Figure, the effect of the taper is to increase the thickness in the direction of noise travel. However, in other embodiments the effect of the taper is to increase the sheet thickness in a direction opposite to noise propagation. Typically, the taper increases the sheet thickness, for example, from a minimum of one millimeter to a maximum of four millimeters.

The acoustic liner of FIG. 9 also comprises an inclined wave guide 44. In other embodiments the inclined wave guide 44 is omitted.

It is expected that a narrow bandwidth attenuation spectrum similar to that illustrated in FIG. 13 would be obtained with the acoustic liner illustrated in FIG. 9.

In other embodiments, at least one face of the perforated facing sheet is of wave form, thus varying the thickness of the sheet.

Referring again to FIG. 8, the acoustic liner comprises a solid backing face (not shown), a stepped perforated facing sheet 32, and wave guides 34 dividing the acoustic liner into generally hexagonal or cubical cells 36. Inclined wave guides 53 are provided in each cell. The porosity of each portion of the perforated facing sheet 32 associated with each cell is non-uniform, i.e. the difference in the total area of the perforated facing sheet and the actual area of solid facing sheet compared with the total area of the perforated facing sheet is varied over the portion of the sheet. In the embodiment shown in FIG. 8 this is simply achieved by varying the number of holes or perforations associated with each step or thickness. It will be seen in the diagram that the concentration of holes or perforations is relatively low in the thin right hand section of the portion and relatively high in the thicker left hand section. The concentrations in the two intermediate sections lies between the concentrations of the two extreme sections.

Typically, the porosity associated with the thinnest and thickest sections is five percent and twenty percent, respectively, while the porosity of the other two sections is ten percent and fifteen percent.

In FIG. 8 the porosity over the portion is shown to reduce in the direction of noise propagation. However, in other embodiments the porosity over the portion reduces in the opposite direction to noise propagation.

The typical narrow bandwidth attenuation spectrum expected with an acoustic liner as illustrated in FIG. 8 shows an increased efficiency over the relevant high frequency range. In other embodiments of the invention the perforated facing sheet is constituted by a plurality of layers, at least some of which may be non-continuous.

In still further embodiments of the invention where the acoustic liner is intended for use within the cross-sectional area of the silencer, the rigid backing face may be replaced by a second perforated perforated facing sheet.

From the above description it will be appreciated that the present invention provides acoustic liners which efficiently attenuate noise and which have expected relative long operational lives.

In further embodiments only some of the silencer walls are provided with acoustic liners.

I claim:

1. An acoustic liner for attenuating noise, comprising a backing face, a perforated facing sheet and a wave guide assembly extending between the backing face and the perforated facing sheet to define a plurality of cells, the portion of the perforated facing sheet associated with each cell having a non-uniform thickness.

2. An acoustic liner as claimed in claim 1, in which the thickness of the perforated facing sheet is non-uniform in the direction of noise propagation relative thereto.

3. An acoustic liner as claimed in claim 2, in which the thickness of the perforated facing sheet is varied by means of steps.

4. An acoustic liner as claimed in claim 2, in which the perforated facing sheet is tapered in the direction of noise propagation.

5. An acoustic liner as claimed in claim 2, in which at least one face of the perforated facing sheet is of wave form.

6. An acoustic liner as claimed in claim 1, in which the perforated facing sheet is constituted by a single layer, the layer having a non-uniform thickness.

7. An acoustic liner as claimed in claim 1, in which the perforated facing sheet is constituted by a plurality of layers, at least some of the layers being non-continuous.

8. An acoustic liner as claimed in claim 1, in which the porosity of the perforated sheet is non-uniform.

9. An acoustic liner as claimed in claim 8, in which the porosity of any particular portion of the perforated facing sheet is associated with the thickness of the portion.

10. An acoustic liner as claimed in claim 1, in which the portion of the perforated facing sheet associated with each cell has a flat face which faces away from the backing face and is substantially parallel thereto.

* * * * *